United States Patent
Gao et al.

(10) Patent No.: US 11,231,614 B2
(45) Date of Patent: Jan. 25, 2022

(54) DISPLAY PANEL AND DISPLAY METHOD THEREOF, DISPLAY DEVICE

(71) Applicants: BOE TECHNOLOGY GROUP CO., LTD., Beijing (CN); Hefei Xinsheng Optoelectronics Technology Co., Ltd., Anhui (CN)

(72) Inventors: Fei Gao, Beijing (CN); Wenming Ren, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 601 days.

(21) Appl. No.: 16/097,673

(22) PCT Filed: Feb. 28, 2018

(86) PCT No.: PCT/CN2018/077566
§ 371 (c)(1),
(2) Date: Oct. 30, 2018

(87) PCT Pub. No.: WO2018/223734
PCT Pub. Date: Dec. 13, 2018

(65) Prior Publication Data
US 2021/0223620 A1    Jul. 22, 2021

(30) Foreign Application Priority Data

Jun. 6, 2017 (CN) .......................... 201710425030.0

(51) Int. Cl.
*G02F 1/1335* (2006.01)
*G02F 1/1337* (2006.01)

(52) U.S. Cl.
CPC .. *G02F 1/133553* (2013.01); *G02F 1/133528* (2013.01); *G02F 1/133784* (2013.01)

(58) Field of Classification Search
CPC .................................................. G02F 1/133553
See application file for complete search history.

(56) References Cited

U.S. PATENT DOCUMENTS 7,379,141 B2    5/2008   Moriya
8,339,550 B2   12/2012   Cui et al.
(Continued)

FOREIGN PATENT DOCUMENTS

CN    101046572 A    10/2007
CN    101614906 A    12/2009
(Continued)

OTHER PUBLICATIONS

Search Report and Written Opinion for International Application No. PCT/CN2018/077566 dated May 9, 2018.
(Continued)

*Primary Examiner* — Edmond C Lau
(74) *Attorney, Agent, or Firm* — Calfee, Halter & Griswold LLP (57) ABSTRACT

A display panel, a display method thereof, and a display device are provided, which are related to the field of display technology and a reflective e-book with high refresh rate is provided. The display panel includes: a first substrate and a second substrate disposed opposite to each other; a liquid crystal (LC) layer located between the first substrate and the second substrate; a polarizer disposed at a side of the LC layer far away from the second substrate; and an alignment layer disposed at both sides of the LC layer, wherein the second substrate is provided with a reflective layer, the reflective layer is configured to allow incident light trans-
(Continued)

mitting through the first substrate to be reflected at a predetermined color on the reflective layer.

8 Claims, 4 Drawing Sheets

(56) References Cited

U.S. PATENT DOCUMENTS

| | | | |
|---|---|---|---|
| 9,261,753 | B2 | 2/2016 | Guo et al. |
| 9,454,034 | B2 | 9/2016 | Zhang et al. |
| 2005/0142464 | A1 | 6/2005 | Moriya |
| 2006/0114379 | A1* | 6/2006 | Nagayama ........ G02F 1/133553 |
| | | | 349/113 |
| 2007/0229738 | A1 | 10/2007 | Nakao et al. |
| 2010/0053755 | A1 | 3/2010 | Lee et al. |
| 2011/0019139 | A1 | 1/2011 | Cui et al. |
| 2012/0268809 | A1 | 10/2012 | Guo et al. |
| 2013/0229607 | A1* | 9/2013 | Seong ............... G02F 1/133707 |
| | | | 349/126 |
| 2015/0168621 | A1 | 6/2015 | Huang |
| 2015/0248038 | A1 | 9/2015 | Zhang et al. |
| 2016/0154284 | A1* | 6/2016 | Sano ................. G02F 1/133553 |
| | | | 349/106 |

FOREIGN PATENT DOCUMENTS

| | | |
|---|---|---|
| CN | 103207474 | 7/2013 |
| CN | 103278963 A | 9/2013 |
| CN | 103547948 A | 1/2014 |
| CN | 103675978 A | 3/2014 |
| CN | 106773257 A | 5/2017 |
| CN | 107247357 A | 10/2017 |
| EP | 2699952 A2 | 2/2014 |
| WO | 2012145677 A2 | 10/2012 |
| WO | 2012145677 A3 | 1/2013 |

OTHER PUBLICATIONS

Office action from Chinese Application No. 201710425030.0 dated Jul. 21, 2020.

* cited by examiner

DISPLAY PANEL AND DISPLAY METHOD THEREOF, DISPLAY DEVICE

CROSS-REFERENCE

The present disclosure claims priority of Chinese Patent Application No. 201710425030.0 filed on Jun. 6, 2017, the disclosure of which is incorporated herein by reference in its entirety as part of the present application.

TECHNICAL FIELD

The present disclosure relates to the field of display technology, and particularly to a display panel, a display method thereof and a display device.

BACKGROUND

E-book display technology is capable of providing a user with an experience like reading a paper book and meanwhile eliminating the issue of causing damage to human eyes due to long time reading because there is no backlight source, and hence possesses advantages such as comfort, environmental protection and no harm to eyes.

An existing e-book display panel usually is based on electrowetting display technology, which applies an electric field effect onto liquid with a free surface so that a distribution region of the liquid is changed under the electric field effect to perform displaying. Restricted by the principle of electric field effect in electrowetting display technology, the existing e-book display panel is poor in refresh rate and is difficult to provide better display quality.

SUMMARY

A first aspect of the present disclosure provides a display panel, the display panel includes: a first substrate and a second substrate disposed to be opposite to each other; a liquid crystal (LC) layer located between the first substrate and the second substrate; a polarizer disposed at a side of the LC layer far away from the second substrate; and an alignment layer disposed at both sides of the LC layer, wherein the second substrate is provided with a reflective layer, the reflective layer is configured to allow incident light transmitting through the first substrate to be reflected at a predetermined color on the reflective layer.

Optionally, the second substrate is divided into a plurality of first sub-pixel regions, a plurality of second sub-pixel regions and a plurality of third sub-pixel regions; the first reflective layer is a colored reflective layer, the colored reflective layer includes a first reflective film, a second reflective film and a third reflective film which are disposed in the first sub-pixel region, the second sub-pixel region and the third sub-pixel region, respectively; the incident light is reflected at a first color, a second color and a third color on the first reflective film, the second reflective film and the third reflective film, respectively; and the first color, the second color and the third color constitute three primary colors.

In an embodiment, the first reflective film is a red color reflective film, the red color reflective film includes a first transmittance part, a first spacer layer having a first thickness, and a first reflective part which are arranged in sequence along a direction far away from the first substrate; wherein the first thickness is configured to allow the incident light to present a red color upon being reflected; the second reflective film is a green color reflective film, the green color reflective film includes a second transmittance part, a second spacer layer having a second thickness, and a second reflective part which are arranged in sequence along a direction far away from the first substrate; wherein the second thickness is configured to allow the incident light to present a green color upon being reflected; and the third reflective film is a blue color reflective film, the blue color reflective film includes a third transmittance part, a third spacer layer having a third thickness, and a third reflective part which are arranged in sequence along a direction far away from the first substrate; wherein the third thickness is configured to allow the incident light to present a blue color upon being reflected.

In an embodiment, at least one of the first transmittance part, the second transmittance part and the third transmittance part is provided with a plurality of holes arranged in an array.

In an embodiment, the first transmittance part, the second transmittance part and the third transmittance part each are made of gold, and the first transmittance part, the second transmittance part and the third transmittance part each have a thickness in the range of 18-22 nm; these three thicknesses can be different from each other, as long as they are in the range; the first reflective part, the second reflective part and the third reflective part each are made of silver, and the first reflective part, the second reflective part and the third reflective part each have a thickness in the range of 135-165 nm; these three thicknesses can be different from each other, as long as they are in the range; the first spacer layer, the second spacer layer and the third spacer layer each are made of aluminum oxide, wherein the first thickness is in the range of 44-52 nm, the second thickness is in the range of 84-102 nm, and the third thickness is in the range of 75-91 nm.

In an embodiment, a diameter of the hole is in the range of 145-155 nm.

Optionally, a rubbing direction of the alignment layer and a polarization direction of the polarizer have an included angle of 45° there-between.

Optionally, the first sub-pixel region, the second sub-pixel region and the third sub-pixel region each are provided with a pixel transistor; and the first reflective film, the second reflective film and the third reflective film each are disposed at a side of the pixel transistor far away from the first substrate.

A second aspect of the present disclosure provides a display method of the above-mentioned display panel, the display method includes: controlling a LC molecule in the LC layer to rotate so that the incident light transmitting through the LC layer presents the predetermined color upon being reflected on the reflective layer and emits from a side of the first substrate.

A third aspect of the present disclosure provides a display device including the above-mentioned display panel.

BRIEF DESCRIPTION OF THE DRAWINGS

Hereinafter, drawings necessary for description of embodiments or related technology are simply introduced in order to more clearly explain technical solution(s) of the embodiments or the related technology of the present disclosure. Obviously, the described drawings below are merely related to some of the embodiments of the present disclosure. For those ordinary skilled in the art, other drawings may be obtained according to these drawings without any creative labor.

DETAILED DESCRIPTION

Hereinafter, technical solution(s) of embodiments of the present disclosure will be described in a definite and complete way in connection with drawings accompanying the embodiments of the present disclosure. Apparently, the described embodiments are only a part of but not all of exemplary embodiments of the present disclosure. Based on the described embodiments of the present disclosure, all other embodiments obtained by those of ordinary skill in the art without creative labor shall fall into the protection scope of the present disclosure.

It should be pointed out that, unless otherwise defined, all the (both technical and scientific) terms used in the embodiments of the present disclosure have the same meanings as commonly understood by one of ordinary skill in the art to which the present disclosure belongs. It should also be appreciated that, the terms, such as those defined in a normal dictionary, should be interpreted as having consistent meanings with that in context of related technology, but shall not be interpreted as idealized or extremely formalized meanings, unless otherwise defined herein.

For example, the terms, such as "first," "second," or the like, which are used in the description and the claims of the present disclosure, are not intended to indicate any sequence, amount or importance, but for distinguishing various components. Also, the terms, such as "comprise/comprising," "include/including," or the like are intended to specify that the elements or the objects stated before these terms encompass the elements or the objects and equivalents thereof listed after these terms, but not preclude other elements or objects. The terms for indicating an orientation or position relationship, such as "on/above", "under/below", "one side", "the other side" or the like, are only used to indicate an orientation or position relationship based on what is illustrated in the drawings for facilitating a simplified description of the technical solution(s) of the present discourse, but not to indicate or imply that the referred device(s) or element(s) must have a specific orientation or must be constructed or operated at the specific orientation. Therefore, it shall not be interpreted as any limitation to the present disclosure.

Figure 1:
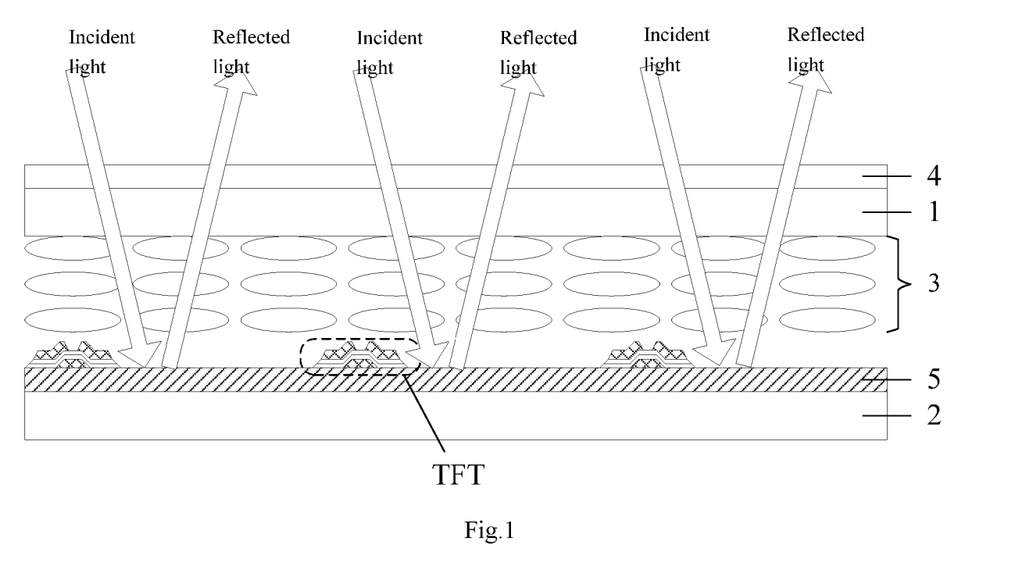
FIG. 1 is a schematic diagram illustrating a structure of a display panel provided by an embodiment of the present disclosure.

As illustrated in FIG. 1, an embodiment of the present disclosure provides a display panel, the display panel includes: a first substrate 1 and a second substrate 2 disposed opposite to each other; a liquid crystal (LC) layer 3 located between the first substrate 1 and the second substrate 2; a polarizer 4 disposed at a side of the LC layer 3 far away from the second substrate 2; an alignment layer disposed at both sides of the LC layer 3; wherein the second substrate 2 is provided with a reflective layer 5, the reflective layer 5 is configured to allow incident light (as illustrated in FIG. 1 by an arrow) transmitting through the first substrate 1 to be reflected at a predetermined color on the reflective layer 5.

It should be explained that, the above-mentioned first substrate 1, for example, can be a transparent cover plate, and the above-mentioned second substrate 2, for example, can be an array substrate (thin film transistor (TFT) substrate) which is disposed opposite to the transparent cover plate and is provided with the above-mentioned reflective layer 5.

The above-mentioned display panel provided by the embodiment of the present disclosure is to display an image by controlling a light transmittance property through liquid crystals (LCs) by utilizing an electric field. As a result, a pixel electrode and a common electrode that generate a controlled electric field both can be disposed on the second substrate 2, depending on different directions of the electric field which drives the LCs, i.e., the above-mentioned display panel is driven by a horizontal electric field; or, the pixel electrode can be disposed on the second substrate 2 while the common electrode is disposed on a corresponding first substrate 1, which structure can refer to a liquid crystal display (LCD) device in the related technology, without particularly limited in the embodiment of the present disclosure.

Because LCs possess optical rotation effect and such optical rotation effect of LCs can be changed under the electric field effect, an on-off control of light can only be achieved by allowing linearly polarized light to pass through the LCs; that is, determining whether the light can be transmitted there-through or not, and controlling an amount of the light transmitted there-through, so as to perform displaying. By comparison, the above-mentioned display panel provided by the embodiment of the present disclosure performs displaying by reflecting external incident light (e.g., ambient light) through the reflective layer 5 to display a predetermined color. As a result, the above-mentioned reflective TFT-LCD e-book provided by the embodiment of the present disclosure only needs to arrange a polarizer 4 at an incident side of ambient light, that is, a side of the above-mentioned LC layer 3 far away from the second substrate 2.

Herein, the polarizer 4 can be disposed at a side of the first substrate 1 far away from the LC layer as illustrated in FIG. 1, and can also be disposed at a side of the first substrate 1 close to the LC layer 3.

Based on this, the above-mentioned reflective TFT-LCD e-book provided by the embodiment of the present disclosure performs displaying by arranging a polarizer 4 above the LC layer 3 (i.e., close to the incident side of ambient light) and by arranging a reflective layer 5 correspondingly below the LC layer 3 to reflect the incident light transmitting through the LC layer 3, with the reflected light having a predetermined color. In this way, the reflective TFT-LCD e-book has a high refresh rate as that in a LCD device, which can provide better reading experience of the e-book.

Figure 2:
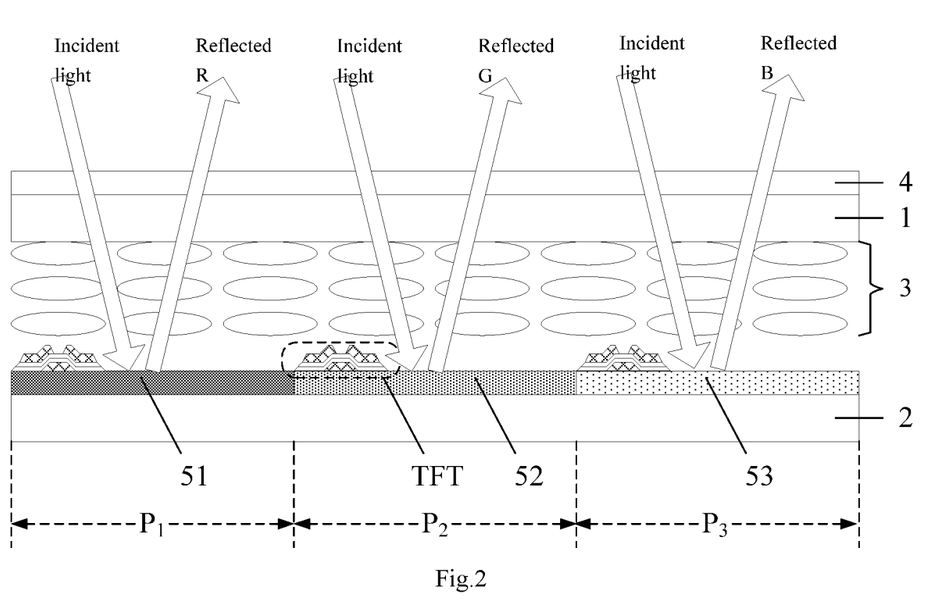
FIG. 2 is another schematic diagram illustrating a structure of a display panel provided by an embodiment of the present disclosure.

Based on the above, in an embodiment, as illustrated in FIG. 2, the above-mentioned second substrate 2 can be divided into a plurality of first sub-pixel regions (denoted by P1 in the drawings), a plurality of second sub-pixel regions (denoted by P2 in the drawings) and a plurality of third sub-pixel regions (denoted by P3 in the drawings); the above-mentioned reflective layer can be a colored reflective layer, including a first reflective film 51, a second reflective film 52 and a third reflective film 53 disposed in the first sub-pixel region P1, the second sub-pixel region P2 and the third sub-pixel region P3, respectively; the incident light is reflected at a first color, a second color and a third color, respectively, on the first reflective film 51, the second reflective film 52 and the third reflective film 53; the first color, the second color and the third color constitute three primary colors.

Herein, the primary color is also referred to as a base color, that is, a fundamental color from which other colors can be obtained by color modulation. The three primary colors usually are the following three colors: red color, green color and blue color; or, yellow color, magenta color and cyan color.

In this way, by controlling the amount of the reflected light through LCs, a colored display can be achieved by reflecting light with the three primary colors, which ensures that the product can provide a comfortable and environmentally friendly reading experience like reading a colored paper book.

Considering that the red color, the green color and the blue color are more appropriate for the three primary colors of colored light, in the embodiment of the present disclosure, the above-mentioned colors presented by the reflected light can be red color (denoted by R in the drawings), green color (denoted by G in the drawings) and blue color (denoted by B in the drawings), respectively.

A structure of the reflective film that achieves reflecting red light, green light and blue light can be, for example, colored printing ink including a red or green or blue pigment particle, a metallic sheet and/or reflective particle configured to reflect the incident light, an organic solvent configured to mix the pigment particle with the metallic sheet and/or reflective particle, and the like.

However, because the pigment particle has a poor reflection effect, the light reflected by the pigment particle is difficult to satisfy the requirements of colored display and requires for the aid of the metallic sheet and/or reflective particle to increase the ambient light irradiated onto a surface of the pigment particle, so as to enhance a reflection of the ambient light on the pigment particle, resulting in that the finally obtained colored reflection effect is difficult to achieve better display effect. Therefore, an embodiment of the present disclosure adopts a reflective film having a structure described as below.

Figure 3:
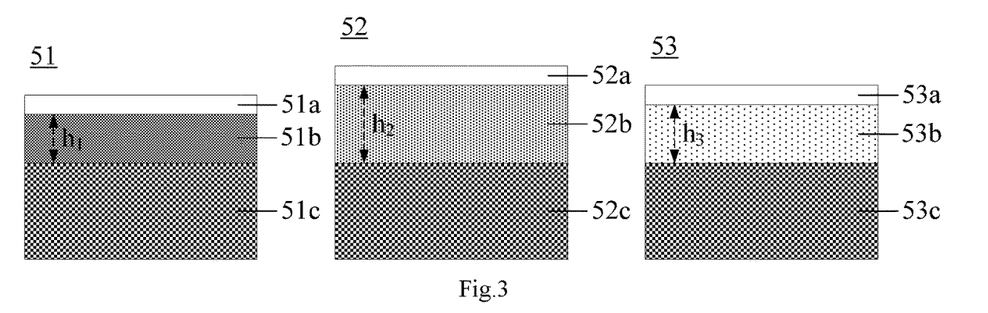
FIG. 3 is a schematic diagram illustrating a sectional structure of a reflective layer in a display panel provided by an embodiment of the present disclosure.

By way of example, as illustrated in FIG. 3, the above-mentioned reflective films having various colors can have structures such that: the first reflective film is a red color reflective film including a first transmittance part 51a, a first spacer layer 51b having a first thickness (denoted by $h_1$ in the drawings) and a first reflective part 51c which are arranged in sequence along a direction far away from the first substrate 1, the first thickness $h_1$ is configured to allow the incident light to present red color upon being reflected; the second reflective film 52 is a green color reflective film including a second transmittance part 52a, a second spacer layer 52b having a second thickness (denoted by $h_2$ in the drawings) and a second reflective part 52c which are arranged in sequence along a direction far away from the first substrate 1, the second thickness $h_2$ is configured to allow the incident light to present green color upon being reflected; the third reflective film 53 is a blue color reflective film including a third transmittance part 53a, a third spacer layer 53b having a third thickness (denoted by $h_3$ in the drawings) and a third reflective part 53c which are arranged in sequence along a direction far away from the first substrate 1, the third thickness $h_3$ is configured to allow the incident light to present blue color upon being reflected.

Herein, description will be given with reference to the case where the first reflective film is just a red color reflective film, by way of example. A microcavity is formed between the first transmittance part 51a configured to transmit the incident light and the first reflective part 51c disposed correspondingly below the first transmittance part 51a, and the incident light will cause a Fabry-Perot interference effect in the spacer layer 51b so as to modulate the color of the reflected light to allow the first reflective film to reflect red light. That is to say, given that materials of the first transmittance part 51a, the first spacer layer 51b and the first reflective part 51c are preconfigured, a length L of the microcavity, that is, a thickness $h_1$ of the first spacer layer 51b has a correspondence with a wavelength λ of the reflected light. That is to say, a microcavity effect that is selective for the wavelength of the reflected light is caused.

The second reflective film, that is, the green color reflective film, and the third reflective film, that is, the blue color reflective film, have the same principle with that of the first reflective film mentioned above, without repeating the details herein.

By way of example, the above-mentioned first transmittance part 51a, second transmittance part 52a and third transmittance part 53a each are made of gold (Au) and have a thickness in the range of 18-22 nm; such thickness is small enough to ensure that the incident light can be transmitted there-through, and these three transmittance parts can have different thicknesses, as long as each of the thicknesses is in that range. By way of example, the first transmittance part 51a, the second transmittance part 52a and the third transmittance part 53a each have a thickness of 20 nm.

The first reflective part 51c, the second reflective part 52c and the third reflective part 53c each are mode of silver (Ag), and the first reflective part 51c, the second reflective part 52c and the third reflective part 53 each have a thickness in the range of 135-165 nm; these three reflective parts can have different thicknesses, as long as each of the thicknesses is in that range. By way of example, the first reflective part 51c, the second reflective part 52c and the third reflective part 53 each have a thickness of 150 nm.

The first spacer layer 51b, the second spacer layer 52b and the third spacer layer 53b each are made of aluminum oxide ($Al_2O_3$). The first thickness $h_1$ is in the range of 44-52 nm so as to reflect red color; the second thickness $h_2$ is in the range of 84-102 nm so as to reflect green color; the third thickness $h_3$ is in the range of 75-91 nm so as to reflect blue color. By way of example, the first spacer layer has a thickness of 48 nm, the second spacer layer has a thickness of 93 nm, and the third spacer layer has a thickness of 83 nm.

In an embodiment, at least one of the above-mentioned first transmittance part 51a, second transmittance part 52a and third transmittance part 53a is provided with a plurality of holes arranged in an array. These holes in an order of nanoscale are arranged to have a short-range ordered property, so that the reflected light is subjected to an intense, resonance scattering to improve the reflection effect of the reflective films.

A diameter of the hole is adjustable according to a thickness of the corresponding transmittance part, without particularly limited in the embodiment of the present disclosure.

By way of example, the diameter of the hole is in the range of 145-155 nm. Given that the above-mentioned first transmittance part 51a, second transmittance part 52a and third transmittance part 53a each are an Au layer with a thickness of 20 nm by way of example, the diameter of the hole can be 150 nm, so as to ensure a good scattering effect.

Based on the above, optionally, a rubbing direction of an alignment layer disposed at both sides of the LC layer 3 and a polarization direction of the above-mentioned polarizer 4 have an included angle of 45° there-between, i.e., the LCs are rotated by 45° at a surface of the alignment layer; the ambient light transmitting through the polarizer 4 is converted into linearly polarized light, and a polarization direction of the linearly polarized light is rotated by 45° when passing through the LC layer 3; the linearly polarized light that is incident onto the reflective layer 5 is reflected to produce linearly polarized reflected light with a predetermined color; a polarization direction of the linearly polarized reflected light then is rotated by 45° through the LCs; and the finally emitted light has a polarization direction perpendicular to the polarization direction of the incident light so that the reflected light cannot be transmitted through the polarizer 4 and a dark-state image is formed. That is to say, the above-mentioned reflective TFT-LCD e-book provided by the embodiment of the present disclosure displays a dark-state image under an initial state where no voltage is applied thereto. As a result, by controlling an alignment direction of the LCs through the electric field, it can achieve controlling a gray level of the e-book and forming a display image.

Based on the above, referring to FIG. 2, the above-mentioned first sub-pixel region P1, second sub-pixel region P2 and third sub-pixel region P3 each are provided with a pixel transistor TFT (denoted by "TFT" in the drawings); the first reflective film 51, the second reflective film 52 and the third reflective film 53 each are disposed at a side of the pixel transistor TFT far away from the first substrate 1; that is, ensuring that the reflective layer 5 is disposed on a relatively flat and smooth substrate so as to ensure the reflected light has a predetermined color.

Based on the above, the embodiment of the present disclosure further provides a display method of the above-mentioned display panel. The display method includes: controlling a LC molecule in the LC layer to rotate, so that the incident light transmitting through the LC layer presents a predetermined color upon being reflected by the reflective layer and emits from a side of the first substrate.

By way of example, assuming that the rubbing direction of the alignment layer and the polarization direction of the polarizer have an included angle of 45°, i.e., assuming that the above-mentioned reflective TFT-LCD e-book displays a dark-state image under an initial state where no voltage is applied thereto, the alignment direction of the LCs can be controlled by utilizing a TFT in the related technology, so as to achieve controlling the gray level of the e-book and forming the display image.

Figure 4:
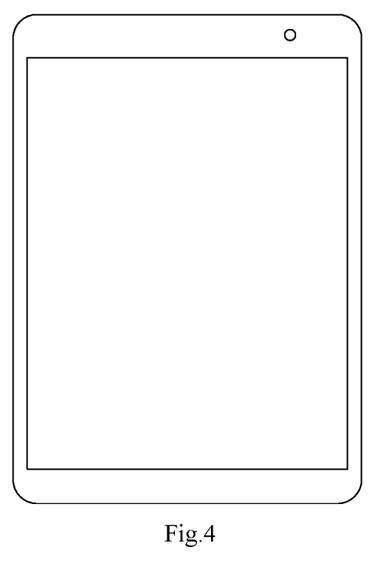
FIG. 4 is a schematic diagram illustrating an exemplary display device provided by an embodiment of the present disclosure.

Based on the above, the embodiment of the present disclosure further provides a display device including the above-mentioned display panel. FIG. 4 is a schematic diagram illustrating an exemplary display device provided by an embodiment of the present disclosure. The display device can be any product or component with a display function, such as e-book, mobile phone, tablet personal computer, digital photo frame and navigator.

The above are merely exemplary implementations of the present disclosure without limiting the protection scope of the present disclosure thereto. Any change or replacement that is easily conceivable for those skilled in the art without departing from the technical scope revealed by the present disclosure shall be fallen within the protection scope of the present disclosure. Therefore, the protection scope of the present disclosure should be based on the protection scope of the appended claims.

What is claimed is:
1. A display panel, comprising:
a first substrate and a second substrate disposed to be opposite to each other;
a liquid crystal (LC) layer located between the first substrate and the second substrate;
a polarizer disposed at a side of the LC layer far away from the second substrate; and
an alignment layer disposed at both sides of the LC layer, wherein
the second substrate is provided with a reflective layer, the reflective layer is configured to allow incident light transmitting through the first substrate to be reflected at a predetermined color on the reflective layer,
wherein the second substrate comprises a plurality of first sub-pixel regions, a plurality of second sub-pixel regions and a plurality of third sub-pixel regions;
the reflective layer is a colored reflective layer, the colored reflective layer comprises a first reflective film, a second reflective film and a third reflective film which are disposed in the first sub-pixel region, the second sub-pixel region and the third sub-pixel region, respectively;
the incident light is reflected at a first color, a second color and a third color on the first reflective film, the second reflective film and the third reflective film, respectively; and the first color, the second color and the third color constitute three primary colors,
the first reflective film is a red color reflective film, the red color reflective film comprises a first transmittance part, a first spacer layer having a first thickness, and a first reflective part which are arranged in sequence along a direction far away from the first substrate; wherein the first thickness is configured to allow the incident light to present a red color upon being reflected;
the second reflective film is a green color reflective film, the green color reflective film comprises a second transmittance part, a second spacer layer having a second thickness, and a second reflective part which are arranged in sequence along a direction far away from the first substrate; wherein the second thickness is configured to allow the incident light to present a green color upon being reflected; and
the third reflective film is a blue color reflective film, the blue color reflective film comprises a third transmittance part, a third spacer layer having a third thickness, and a third reflective part which are arranged in sequence along a direction far away from the first substrate; wherein the third thickness is configured to allow the incident light to present a blue color upon being reflected,
wherein at least one of the first transmittance part, the second transmittance part and the third transmittance part is provided with a plurality of holes arranged in an array,
the first transmittance part, the second transmittance part and the third transmittance part each are made of gold, and the first transmittance part, the second transmittance part and the third transmittance part each have a thickness in the range of 18-22 nm;
the first reflective part, the second reflective part and the third reflective part each are made of silver, and the first reflective part, the second reflective part and the third reflective part each have a thickness in the range of 135-165 nm; and
the first spacer layer, the second spacer layer and the third spacer layer each are made of aluminum oxide, wherein the first thickness is in the range of 44-52 nm, the second thickness is in the range of 84-102 nm, and the third thickness is in the range of 75-91 nm.

2. The display panel according to claim 1, wherein a diameter of the hole is in the range of 145-155 nm.

3. The display panel according to claim 1, wherein
the first transmittance part, the second transmittance part and the third transmittance part each are made of gold, and the first transmittance part, the second transmittance part and the third transmittance part each have a thickness of 20 nm;
the first reflective part, the second reflective part and the third reflective part each are made of silver, and the first reflective part, the second reflective part and the third reflective part each have a thickness of 150 nm; and
the first spacer layer, the second spacer layer and the third spacer layer each are made of aluminum oxide, wherein the first thickness is in the range of 48 nm, the second thickness is 93 nm, and the third thickness is 83 nm.

4. The display panel according to claim 3, wherein a diameter of the hole is 150 nm.

5. The display panel according to claim 1, wherein a rubbing direction of the alignment layer and a polarization direction of the polarizer have an included angle of 45° there-between.

6. The display panel according to claim 1, wherein the first sub-pixel region, the second sub-pixel region and the third sub-pixel region each are provided with a pixel transistor; and
the first reflective film, the second reflective film and the third reflective film each are disposed at a side of the pixel transistor far away from the first substrate.

7. A display method of a display panel, the display panel comprising: a first substrate and a second substrate disposed to be opposite to each other; a liquid crystal (LC) layer located between the first substrate and the second substrate; a polarizer disposed at a side of the LC layer far away from the second substrate; and an alignment layer disposed at both sides of the LC layer, wherein the second substrate is provided with a reflective layer, the reflective layer is configured to allow incident light transmitting through the first substrate to be reflected at a predetermined color on the reflective layer, wherein the display method comprises:
controlling a LC molecule in the LC layer to rotate so that the incident light transmitting through the LC layer presents the predetermined color upon being reflected on the reflective layer and emits from a side of the first substrate,
wherein the second substrate comprises a plurality of first sub-pixel regions, a plurality of second sub-pixel regions and a plurality of third sub-pixel regions;
the reflective layer is a colored reflective layer, the colored reflective layer comprises a first reflective film, a second reflective film and a third reflective film which are disposed in the first sub-pixel region, the second sub-pixel region and the third sub-pixel region, respectively;
the incident light is reflected at a first color, a second color and a third color on the first reflective film, the second reflective film and the third reflective film, respectively; and the first color, the second color and the third color constitute three primary colors,
the first reflective film is a red color reflective film, the red color reflective film comprises a first transmittance part, a first spacer layer having a first thickness, and a first reflective part which are arranged in sequence along a direction far away from the first substrate; wherein the first thickness is configured to allow the incident light to present a red color upon being reflected;
the second reflective film is a green color reflective film, the green color reflective film comprises a second transmittance part, a second spacer layer having a second thickness, and a second reflective part which are arranged in sequence along a direction far away from the first substrate; wherein the second thickness is configured to allow the incident light to present a green color upon being reflected; and
the third reflective film is a blue color reflective film, the blue color reflective film comprises a third transmittance part, a third spacer layer having a third thickness, and a third reflective part which are arranged in sequence along a direction far away from the first substrate; wherein the third thickness is configured to allow the incident light to present a blue color upon being reflected,
wherein at least one of the first transmittance part, the second transmittance part and the third transmittance part is provided with a plurality of holes arranged in an array,
the first transmittance part, the second transmittance part and the third transmittance part each are made of gold, and the first transmittance part, the second transmittance part and the third transmittance part each have a thickness in the range of 18-22 nm;
the first reflective part, the second reflective part and the third reflective part each are made of silver, and the first reflective part, the second reflective part and the third reflective part each have a thickness in the range of 135-165 nm; and
the first spacer layer, the second spacer layer and the third spacer layer each are made of aluminum oxide, wherein the first thickness is in the range of 44-52 nm, the second thickness is in the range of 84-102 nm, and the third thickness is in the range of 75-91 nm.

8. A display device, comprising a display panel, the display panel comprising:
a first substrate and a second substrate disposed to be opposite to each other;
a liquid crystal (LC) layer located between the first substrate and the second substrate;
a polarizer disposed at a side of the LC layer far away from the second substrate; and
an alignment layer disposed at both sides of the LC layer, wherein
the second substrate is provided with a reflective layer, the reflective layer is configured to allow incident light transmitting through the first substrate to be reflected at a predetermined color on the reflective layer,
wherein the second substrate comprises a plurality of first sub-pixel regions, a plurality of second sub-pixel regions and a plurality of third sub-pixel regions;
the reflective layer is a colored reflective layer, the colored reflective layer comprises a first reflective film, a second reflective film and a third reflective film which are disposed in the first sub-pixel region, the second sub-pixel region and the third sub-pixel region, respectively;
the incident light is reflected at a first color, a second color and a third color on the first reflective film, the second reflective film and the third reflective film, respectively; and the first color, the second color and the third color constitute three primary colors,
the first reflective film is a red color reflective film, the red color reflective film comprises a first transmittance part, a first spacer layer having a first thickness, and a first reflective part which are arranged in sequence along a direction far away from the first substrate; wherein the first thickness is configured to allow the incident light to present a red color upon being reflected;

the second reflective film is a green color reflective film, the green color reflective film comprises a second transmittance part, a second spacer layer having a second thickness, and a second reflective part which are arranged in sequence along a direction far away from the first substrate; wherein the second thickness is configured to allow the incident light to present a green color upon being reflected; and the third reflective film is a blue color reflective film, the blue color reflective film comprises a third transmittance part, a third spacer layer having a third thickness, and a third reflective part which are arranged in sequence along a direction far away from the first substrate; wherein the third thickness is configured to allow the incident light to present a blue color upon being reflected, wherein at least one of the first transmittance part, the second transmittance part and the third transmittance part is provided with a plurality of holes arranged in an array, the first transmittance part, the second transmittance part and the third transmittance part each are made of gold, and the first transmittance part, the second transmittance part and the third transmittance part each have a thickness in the range of 18-22 nm;

the first reflective part, the second reflective part and the third reflective part each are made of silver, and the first reflective part, the second reflective part and the third reflective part each have a thickness in the range of 135-165 nm; and the first spacer layer, the second spacer layer and the third spacer layer each are made of aluminum oxide, wherein the first thickness is in the range of 44-52 nm, the second thickness is in the range of 84-102 nm, and the third thickness is in the range of 75-91 nm.

* * * * *